Aug. 1, 1933.  F. TINKER  1,920,815
DISTILLATION OF CRUDE OILS
Original Filed Feb. 9, 1927
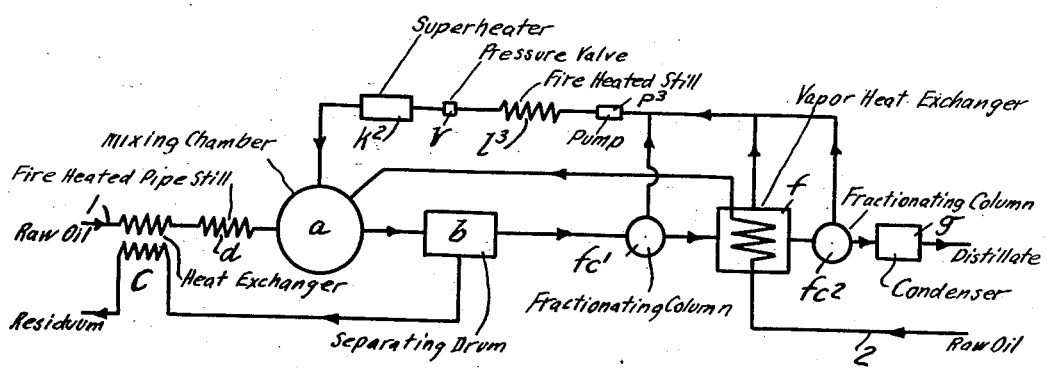
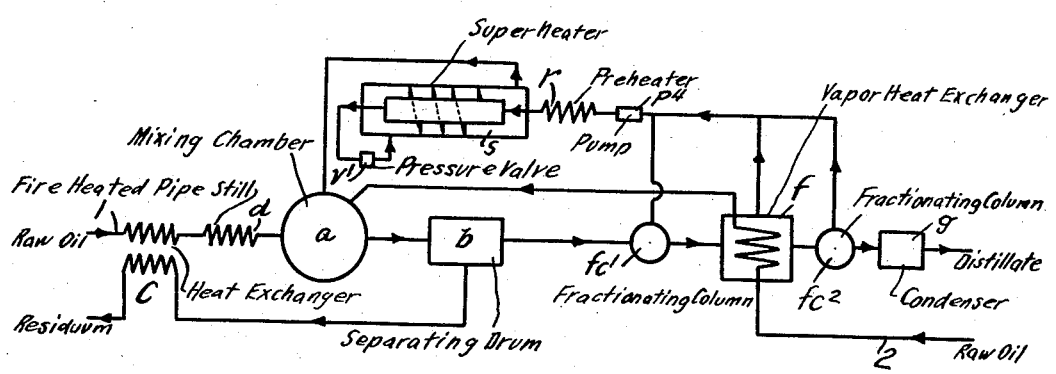
INVENTOR
Frank Tinker
BY
Pennie, Davis, Marvin & Edwards
ATTORNEYS Patented Aug. 1, 1933

1,920,815

UNITED STATES PATENT OFFICE 1,920,815

DISTILLATION OF CRUDE OILS

Frank Tinker, Streetly, England, assignor to Sinclair Refining Company, New York, N. Y., a Corporation of Maine Original application February 9, 1927, Serial No. 167,047. Divided and this application September 9, 1930, and in Great Britain April 28, 1926. Serial No. 480,716

5 Claims. (Cl. 196—58)

In the distillation of crude oils, (including topped oils, fuel oils, and gas oils), shale oils, tars and the like, more particularly in what are known as topping plants, it is becoming increasingly common to use heat exchange apparatus for the purpose of economizing fuel and also reducing the amount of water cooling which is otherwise necessary.

The object of the present invention is to provide a distillation system, combined with one of several cracking systems, in which heat exchange can be carried out more effectively and economically and to a further extent than is usual and in such a way that the different parts of the plant are capable of independent control.

The invention comprises the use in the system, of a mixing chamber into which hot liquids or vapors or mixtures of liquid and vapor from different parts of the system are delivered and mixed so as to attain a common temperature prior to their entering a separating chamber for liquid and vapor, thus enabling outgoing heat derived from any part of the system to be returned to and usefully employed in the system.

This application is a division of my prior application Serial No. 167,047 filed February 9, 1927, which has matured into Letters Patent Number 1,779,222, granted October 21, 1930. In the topping plant consisting of a fire-heated pipestill, a mixing chamber, a separating chamber, a plurality of fractionating towers and fractional condensers and a condenser for light distillates, illustrated in Figures 1 and 2 of my prior application, hot residuum from the separating chamber is taken as heretofore through a heat exchanger in which crude oil before entering the pipestill is subjected to a preliminary heating; hot refluxed oil from one or more of the fractional condensers is also passed through heat exchangers and caused to heat cold crude oil which is passed next through a coil or pipes inserted in the fractional condensers for further heating and is finally delivered to the mixing chamber where it mixes with the hot oil or vapor from the fire-heated still. Crude oil is thus used for cooling the contents of and effluents from the condensers and also for condensing the vapors, and is itself thereby heated to a temperature at which it can advantageously be mixed with the main stream flowing through the system.

By combining the above described topping plant with the branch cracking systems to be described more fully later, oil may be cracked under pressure in the liquid phase, liquid being refluxed from any or all of the fractional condensers and fractionating columns and forced by a pump through a pressure still and separating drum each working under any desired pressure. Cracked liquid residue is discharged from the branch circuit, and the cracked vapors are delivered into the mixing chamber of the main system. Alternatively the residue from the separating chamber of the system first described may be pumped through a still and separating drum, and the cracked vapors delivered into the mixing chamber.

By the use of a common mixing chamber, into which hot liquid or vapor or mixtures of liquid and vapor derived from different parts of the system can be delivered, heat given up in the cooling of distillates and residues may be utilized economically to reduce initial cost and upkeep charges in the fire-heated part of the system, and generally to effect important economies in the operation of distillation plants.

The two accompanying diagrams illustrate different modes of carrying my invention into effect.

Figure 1 of my prior application shows a topping plant which is fed, instead of by one stream of crude oil as is usual, by two streams of crude oil merging after preheating in the manner outlined below, into the mixing chamber $a$. In this chamber the streams commingle at the top, and flow downwards over baffle plates into a separating drum $b$ wherein the liquid oils of the mixed stream are separated from the entangled vapors. The crude oil stream flowing in the pipe 1 is preheated on its way to the mixing chamber $a$ firstly by indirect heat exchange (in heat exchanger $c$) with the liquid residuum flowing from the separating drum, and secondly by a fire-heated pipe-still $d$, where it can be raised to any desired temperature immediately before entering $a$. The crude oil stream in the pipe 2 is preheated by a vapor heat exchanger $f$ in which considerable volumes of the medium and heavier vapors flowing from the separating drum towards the water condenser $g$ are fractionally condensed by means of a coil or pipes inserted therein through which flows the crude oil stream 2.

On either side of the fractional condenser or vapor heat exchanger $f$ it is convenient to place two fractionating columns $fc^1$, and $fc^2$, so that the grade of distillate condensed in $f$ can be controlled. $g$ in the diagram is an ordinary water cooled condenser which condenses the light oils escaping liquefaction in $fc^1$, $f$ and $fc^2$.

It is clear that the coil or pipe area in $f$ can be made of such a size, and the amount of crude oil stream 2 regulated in such a way, that the desired amount of condensation of medium and/or heavy fractions can be obtained in $f$ and crude oil stream 2 raised to something like the desired distillation temperature before it commingles with the crude oil stream 1 in mixing chamber $a$. It is likewise clear that the temperature of the mixed stream can be controlled by imparting a little more or less heat as may be required to the crude oil stream 1 by means of the fire-heated pipestill $d$.

It is evident also that a supplementary indirect heat exchanger $f^2$ between condensing vapors and a further crude oil stream 3 may be placed in the vapor path between $fc^2$ and the water condenser $g$ as shown in Figure 6 of my prior application. If this were done it is advisable to pass this third stream of crude oil through a pipestill $d^2$ before introducing it into the mixing chamber $a$.

Figure 1 of the present application illustrates one form of the combined distillation cracking system in which the cracking of refluxes is carried out partly in the liquid phase and thereafter partly in the vapor phase. Refluxed oils from $f$ together if desired with oils refluxed from either or both $fc^1$ and $fc^2$ are supplied by a pump $p^3$ to a still $l^3$ and cracked under pressure in the liquid phase after which the oil is passed into a vapor superheater $k^2$ and further subjected to cracking while in the vapor state. A loaded valve V set to work at a pressure sufficient to keep the hydrocarbon oil in a liquid state is placed in a position between the liquid phase cracking still $l^3$ (preferably of the pipestill pattern and supplied by a pump $p^3$) and a vapor superheater $k^2$ following it. A separating drum may be placed in the branch circuit but is generally dispensed with as the extent of cracking in the liquid phase need not be carried so far as is otherwise necessary for economical operation when the same hydrocarbon is to be further cracked subsequently in the vapor phase.

Furthermore, it has been found convenient as shown in Figure 2 of my present application, to employ a branch circuit for cracking refluxes which is built on the following lines. The refluxes are taken from the bottoms of the towers and forced by means of a pump $p^4$ through a preheater $r$ and then through a contrary flow superheater $s$ of similar design to that shown in my U. S. Patent No. 1,393,184. This superheater comprises an inner and outer tube the annular space between which contains a helical partition for causing the fluid to flow along a helical path. A loaded valve $v^1$ is however, placed at the point where the hydrocarbon oil returns in the space between the inner tube and the outer tube which latter is heated externally by fire. The loaded valve $v^1$ is set so as to keep the oil liquid or mostly so, whilst it is being heated in the preheater to say 400° C. or thereabouts and subsequently whilst it is picking up still more heat in its passage through the inner tube of the cracking chamber. After the oil leaves the loaded valve it wholly vaporizes in the space between the inner and outer tube where it is further cracked in the form of vapor.

It is evident that other methods of cracking involving superheating either in the liquid phase or vapor phase or both can be applied to the invention by means of a branch circuit. For instance the insertion of a loaded valve at a point between the outlet of the contrary flow superheater $s$ of Figure 5 and the mixing chamber $a$ enables hydrocarbon oil to be heated in such a system in two pressure stages, both stages being liquid, or liquid and vapor consecutively, or liquid and foam consecutively as desired. In the case in which the hydrocarbon oil is kept liquid by pressure in both stages, much higher pressures than are now usual can be applied during the first stage to the oil flowing through $r$ and the inner tube of $s$, since a pressure is also being applied to the outer surface of the inner tube of $s$. With suitable steel tubes it is possible to apply with safety pressures up to 1000 lbs. in $r$, and also in the inner tube of $s$ if the oil in the space between the inner and outer tube of $s$ is kept at a pressure round about 500 lbs.

Having thus described my invention what I claim as new and desire to secure by Letters Patent is:—

1. In the distillation of mineral oils, the improvement which comprises passing a stream of raw oil through a heating zone into a mixing zone and heating it to a distillation temperature in the heating zone, introducing a hot oil mixture including this thus heated raw oil from the mixing zone into a separating zone, discharging residuum from the separating zone, taking off vapors from the separating zone and partially condensing the same, passing a stream of condensate from this partial condensation through a fire-heated heating zone separate from the first mentioned heating zone and heating it to a cracking temperature under superatmospheric pressure therein, reducing the pressure on the hot oil products discharged from this fire-heated heating zone, passing a stream of these hot oil products under reduced pressure through another fire-heated heating zone separate from the first mentioned heating zone and heating it to a higher cracking temperature therein, introducing the hot oil products from the last mentioned fire-heated heating zone into the mixing zone and taking off vapors from the partial condensation and condensing the same.

2. In the distillation of mineral oils, the improvement which comprises passing a stream of raw oil through a heating zone into a mixing zone and heating it to a distillation temperature in the heating zone, introducing a hot oil mixture including this thus heated raw oil from the mixing zone into a separating zone, discharging residuum from the separating zone, taking off vapors from the separating zone and partially condensing the same by heat exchange with another stream of raw oil, introducing the thus preheated raw oil into the mixing zone, passing a stream of condensate from this partial condensation through a fire-heated heating zone separate from the first mentioned heating zone and heating it to a cracking temperature under superatmospheric pressure therein, reducing the pressure on the hot oil products discharged from this fire-heated heating zone, passing a stream of these hot oil products under reduced pressure through another fire-heated heating zone separate from the first mentioned heating zone and heating it to a higher cracking temperature therein, introducing the hot oil products from the last mentioned fire-heated heating zone into the mixing zone and taking off vapors from the partial condensation and condensing the same.

3. In the distillation of mineral oils, the improvement which comprises passing a stream of raw oil through a heating zone into a mixing zone and heating it to a distillation temperature in the heating zone, introducing a hot oil mixture including this thus heated raw oil from the mixing zone into a separating zone, discharging residuum from the separating zone, taking off vapors from the separating zone and partially condensing the same, passing a stream of condensate from this partial condensation through a fire-heated heating zone separate from the first mentioned heating zone and heating it to a cracking temperature under superatmospheric pressure substantially in the liquid phase therein, reducing the pressure on the hot oil products discharged from this fire-heated heating zone, passing a stream of these hot oil products under reduced pressure through another fire-heated heating zone separate from the first mentioned heating zone and heating it to a higher cracking temperature substantially in the vapor phase therein, introducing the hot oil products from the last mentioned fire-heated heating zone into the mixing zone and taking off vapors from the partial condensation and condensing the same.

4. In the distillation of mineral oils, the improvement which comprises passing a stream of raw oil through a heating zone into a mixing zone and heating it to a distillation temperature in the heating zone, introducing a hot oil mixture including this thus heated raw oil from the mixing zone into a separating zone, discharging residuum from the separating zone, taking off vapors from the separating zone and partially condensing the same, passing a stream of condensate from this partial condensation through a heating zone separate from the first mentioned heating zone and heating it to a cracking temperature under superatmospheric pressure therein, reducing the pressure on the hot oil products discharged from this heating zone, passing a stream of these hot oil products under reduced pressure through a fire-heated heating zone separate from the first mentioned heating zone and heating it to a higher cracking temperature therein, the stream of condensate in the first mentioned separate heating zone being heated by indirect heat exchange with the stream of hot oil products in said fire-heated heating zone, introducing the hot oil products from the last mentioned fire-heated heating zone into the mixing zone and taking off vapors from the partial condensation and condensing the same.

5. In the distillation of mineral oils, the improvement which comprises passing a stream of raw oil through a heating zone into a mixing zone and heating it to a distillation temperature in the heating zone, introducing a hot oil mixture including this thus heated raw oil from the mixing zone into a separating zone, discharging residuum from the separating zone, taking off vapors from the separating zone and partially condensing the same, passing a stream of condensate from this partial condensation through a heating zone separate from the first mentioned heating zone and heating it to a cracking temperature under superatmospheric pressure substantially in the liquid phase therein, reducing the pressure on the hot oil products discharged from this heating zone, passing a stream of these hot oil products under reduced pressure through a fire-heated heating zone separate from the first mentioned heating zone and heating it to a higher cracking temperature substantially in the vapor phase therein, the stream of condensate in the first mentioned separate heating zone being heated by indirect heat exchange with the stream of hot oil products in said fire-heated heating zone, introducing the hot oil products from the last mentioned fire-heated heating zone into the mixing zone and taking off vapors from the partial condensation and condensing the same.

FRANK TINKER.